United States Patent [19]

Kauffman et al.

[11] 4,384,904

[45] May 24, 1983

[54] PROCESS OF FORMING AN EMBOSSED SURFACE COVERING HAVING A WEAR LAYER ATTACHED UNIFORMLY THERETO

[75] Inventors: William J. Kauffman, Penn Township, Westmoreland County; George L. Lilley, Rapho Township, Lancaster County, both of Pa.

[73] Assignee: Armstrong World Industries, Inc., Lancaster, Pa.

[21] Appl. No.: 295,692

[22] Filed: Aug. 24, 1981

[51] Int. Cl.$^3$ .......................... B32B 5/18; B31F 1/00; B05D 5/00
[52] U.S. Cl. ........................... 156/78; 156/209; 156/219; 156/221; 427/244; 427/270
[58] Field of Search ............... 156/209, 219, 221, 223, 156/228, 220, 212, 297, 301, 77, 300, 78, 79, 302, 198, 324; 427/244, 373, 370, 264; 428/159; 264/45.4, 45.5, 45.2, 46.5, 46.6, 52, 53

[56] References Cited

U.S. PATENT DOCUMENTS

| | | | |
|---|---|---|---|
| 3,808,024 | 4/1974 | Witman | 427/373 |
| 3,856,592 | 12/1974 | Giorgi | 156/220 |
| 4,075,049 | 2/1978 | Wood | 156/220 |
| 4,085,239 | 4/1978 | Briston et al. | 427/244 |
| 4,198,448 | 4/1980 | Kauffman et al. | 427/244 |
| 4,230,759 | 10/1980 | Kauffman et al. | 156/79 |
| 4,258,085 | 3/1981 | Kauffman et al. | 427/244 |
| 4,277,427 | 7/1981 | Kaminski et al. | 427/373 |

*Primary Examiner*—Edward C. Kimlin
*Assistant Examiner*—Louis Falasco
*Attorney, Agent, or Firm*—Laird F. Miller

[57] ABSTRACT

The present invention relates to superior wear layer-coated embossed surface coverings which are prepared by depositing a cross-linking initiator on at least a portion of the surface of a cross-linkable foam formed on a backing. Preferably a wear layer is applied at this point and cross-linking of the affected areas is accomplished by heating the sheet. The sheet of material is either uniformly or differentially heated and then uniformly compressed to a desired embossing depth using a non-patterned press or roll. The noncross-linked regions remain depressed upon removal of the compressing force whereas the cross-linked regions return essentially to their original height. The wear layer remains in contact with all of the foam regions so that the resulting sheet of material has a wear layer which is uniformly adhered to the contour of the foam layer. The surface of the sheet has an embossed or textured finish.

23 Claims, No Drawings

PROCESS OF FORMING AN EMBOSSED SURFACE COVERING HAVING A WEAR LAYER ATTACHED UNIFORMLY THERETO

This invention relates to decorative surface coverings and more specifically to a process of forming embossed surface coverings having attached wear layers whereby said wear layers are uniformly interfaced with said coverings to provide enhanced definition of decorative patterns disposed thereunder.

BACKGROUND OF THE INVENTION

The need for methods for producing decorative effects on surface coverings is well known. Although a variety of methods for producing such coverings is available, associated with these methods are certain problems which the industry constantly attempts to overcome. Among these is the problem of preparing an embossed surface covering having a wear layer attached uniformly thereto.

Embossing has traditionally been accomplished by mechanical means using patterned embossing rolls; however, recent advances in technology have tended to avoid the use of mechanical embossing because the patterned embossing rolls are quite expensive to make. Accordingly, chemical methods have been developed to achieve the same result. The products obtained by these methods have not always been satisfactory, however, as will be more fully explained below.

THE PRIOR ART

A variety of methods have been disclosed which avoid the use of mechanical embossing. For example, U.S. Pat. No. 2,961,332 disposed a process whereby various resinous compositions containing different blowing agents were printed on a surface and heated to decompose the blowing agents and give a textured surface. U.S. Pat. No. 2,964,799 disclosed a process whereby a foamable resinous composition was formed into a sheet and heated selectively to give raised areas at the selected sites. U.S. Pat. No. 2,825,282 disclosed a process whereby radiant energy-absorbing pigments were printed on a foamable composition and then exposed to radiant energy. The energy-absorbing areas became hotter than the imprinted areas, causing the blowing agent to decompose and form cellular foam. U.S. Pat. Nos. 3,293,094 and 3,293,108 disclosed procedures whereby blowing agent inhibitors were applied to affect the temperature at which blowing agents contained in a resinous composition would decompose, thereby giving selectively textured surface areas. Related techniques are also found in U.S. Pat. Nos. 3,574,659; 3,607,341; 3,943,018; 3,956,530; 3,958,043; 3,958,054; 4,193,957; and 4,230,759.

The references which are closest to the present invention are our own U.S. Pat. Nos. 4,258,085 and 4,198,448 which relate to processes for forming embossed surface coverings on a backing. In the process of the former patent, a cross-linkable foam on a backing is partially coated with a composition comprising a cross-linking initiator and heated to cross-link the initiator-coated regions while melting the noncross-linked regions. The cross-linked regions remain raised whereas the noncross-linked regions flow by gravity into the valleys giving the surface an embossed appearance. The latter patent concerns an analagous process in that an initiator is placed in or on the foam which is then coated with a cross-linking inhibitor that prevents cross-linking when the foam is heated. This process also yields a comparable textured surface.

Although these processes constitute definite advancements in the art, particular problems have been encountered when these surfaces have been provided with wear layers. A wear layer placed on a uniform foam surface prior to cross-linking tends to adhere uniformly because the foam surface is relatively flat. However, when the foam is heated to initiate cross-linking, the noncross-linked areas flow and consolidate into valleys whereas the cross-linked areas remain raised. The effect which is achieved is that of a textured or embossed surface because the wear layer tends to sag into the valleys. However, unless the melting characteristics of the noncross-linked foam and the wear layer are similar, the melted foam can separate from the wear layer in the valley areas such that it adheres only to the high spots; i.e., the cross-linked regions. This results in an inherent structural weakness in the sheet which ultimately can result in the separation of the wear layer from the foam backing. In addition, there is a clearly apparent loss of visual definition of patterns lying under the wear layer. The conventional way to handle this problem is to carefully match the melting charcteristics of the wear layer and the underlying foam; however, this is not always possible, especially where high-performance, high-melting urethane wear layers are used. Alternatively a patterned embossing roll could be used, but that is undesirable not only because of cost but because the roll must be maintained in register with the pattern of the surface. Such solutions to these problems are obviously unsatisfactory because they are the ones which the processes disclosed in U.S. Pat. Nos. 4,258,085 and 4,198,448 were designed to avoid.

Accordingly, one objective of the present invention is to provide surface coverings having wear layers uniformly attached thereto.

Yet another objective of the present invention is to provide such surface coverings having superior pattern definition.

Still another objective of the present invention is to provide surface coverings with improved structural strength.

Still yet another objective of the present invention is to provide surface coverings by a process through which the problems encountered in matching the melting characteristics of a wear layer and the underlying foam may be obviated.

These and other advantages will become apparent from the detailed description of preferred embodiments will follow.

SUMMARY OF THE INVENTION

The present invention relates to superior wear layer-coated embossed surface coverings which are prepared by depositing a cross-linking initiator on at least a portion of the surface of a cross-linkable foam formed on a backing. Preferably a wear layer is applied at this point and cross-linking of the affected areas is accomplished by heating the sheet. The sheet of material is either uniformly or differentially heated and then uniformly compressed to a desired embossing depth using a non-patterned press or roll. The noncross-linked regions remain depressed upon removal of the compressing force whereas the cross-linked regions return essentially to their original height. The wear layer remains in contact with all of the foam regions so that the resulting sheet of material has a wear layer which is uniformly adhered to the contour of the foam layer. The surface of the sheet has an embossed or textured finish.

DETAILED DESCRIPTION OF PREFERRED EMBODIMENTS

The present invention provides a process for forming embossed surface coverings from cross-linkable foam on a backing. In one preferred embodiment, said process comprises the steps of forming said foam on said backing, selectively depositing a cross-linking initiator on the foam surface, applying a first wear layer coating over at least a portion of said foam surface, heating the coated foam to fuse the foam and wear layer and effect cross-linking of the initiator-coated regions, adjusting the temperature of the cross-linked composite material at least to a temperature at which the noncross-linked foam will flow under pressure, applying sufficient uniform pressure to said cross-linked composite material to compress it to a desired embossing depth, said pressure being not greater than that pressure which will compress said material to a density equal to the bulk density of the noncross-linked foam, and removing the compressing force. As a result of this process, the noncross-linked regions are embossed whereas cross-linked regions substantially return to their original height.

In a second preferred embodiment, a process is provided for forming embossed surface coverings from a cross-linkable foam on a backing. Said process comprises the steps of forming said foam on said backing, selectively depositing a cross-linking initiator on the form backing, heating the foam to effect cross-linking of the initiator coated regions, applying a wear layer coating to the partially cross-linked sheet, adjusting the temperature of the cross-linked composite material at least to a temperature at which the noncross-linked foam will flow under pressure, applying sufficient uniform pressure to said cross-linked composite material to compress it to a desired embossing depth, said pressure being not greater than that pressure which will compress said material to a density equal to the bulk density of the noncross-linked foam, and removing the compressing force. As a result of this process, the noncross-linked regions are embossed whereas cross-linked regions substantially return to their original height.

As used herein, the term "cross-linkable foam" is understood to mean (1) a foam formed from a composition comprising at least one thermosplastic resin homopolymer, copolymer blend or polymer mixture, and a polyfunctional reactive monomer which will cross-link, or (2) a foam formed from a composition comprising at least one thermoplastic polyfunctional reactive resin which contains sufficient functionality to cross-link. If the foam contains a polyfunctional reactive monomer as set forth in (1) above, it is further understood that the polyfunctional reactive monomer can be incorporated into the foam by either superimposing the monomer over the foam surface and allowing the monomer to migrate into the foam or by incorporating the monomer directly into the foam composition prior to foaming the composition.

As used herein, the term "cross-link" is understood to mean an effective increase in the molecular weight, up to and including the point of insolubility, of a cross-linkable foam, which increases in molecular weight affects the melt rheology of the cross-linkable foam by increasing its melt viscosity.

As used herein, the term "activator composition" is understood to mean a composition which facilitates cross-linking of the cross-linkable foam. Depending on the method of application, the activator composition may comprise an initiator (or catalyst) in pure form, or it may be varied to include very small quantities of said initiator (or catalyst).

As used herein, the term "deactivator composition" is understood to mean a composition which either stops, retards or alters cross-linking of the cross-linkable foam. Depending on the method of application, the deactivator composition may comprise an inhibitor in pure form, or it may be varied to include extremely low levels of said inhibitor.

As used herein, in relation to polymers, the term "flow temperature" is understood to mean that temperature associated with either crystalline melt flow or glass transition flow. To provide further understanding relating to the flow associated with crystalline melt or the flow associated with glass transition, reference is made to J. A. Brydson, Plastic Materials 33–42 (1966), herein incorporated by reference.

As used herein, "bulk density" is defined to mean that density which approximately corresponds to the total density of the components of the formed foam as measured in the non-foamed state.

The cross-linkable foam which is placed on the backing may be formed by mechanical incorporation of a gas, i.e., frothing, into the cross-linkable foam composition, which may then be placed on the backing. Alternatively, the cross-linkable foam may be produced by incorporating a blowing agent into the cross-linkable foam composition, depositing the composition on a backing and heating the composition to decompose the blowing agent, evolve gas and form a cellular structure.

In addition to these alternatives, the cross-linkable foam-containing sheet may be reversibly compressed prior to the deposition of the activator/deactivator compositions, as more fully discussed below, by heating the sheet and simultanteously compressing and cooling it in a laminator as set forth in U.S. Pat. Nos. 4,198,448 and 4,258,085.

The cross-linkable foam composition of this invention will contain at least one thermoplastic resin or a thermoplastic polyfunctional reactive resin, the only limitation in the selection of the resin being that it must be foamable.

Thermoplastic resins particularly suitable for use include poly (vinyl chloride) resins, acrylic resins, vinyl acetate resins, vinyl chloride-vinyl acetate copolymers, and the like. Thermoplastic polyfunctional reactive resins suitable for use include block copolymers of styrene and butadiene, maleic acid polyesters, and the like.

The cross-linkable foam composition (if a thermoplastic resin is employed) can preferably contain from about 8 to 100 parts per 100 parts of resin of a polyfunctional reactive monomer, and more preferably from about 10 to about 30 parts per 100 parts of resin of the monomer.

Any suitable polyfunctional reactive monomer can be employed. Suitable monomers include polyfunctional melamine-formaldehyde resins, polyfunctional urea-formaldehyde resins, and polyfunctional olefins, for example, polyfunctional methylmethacrylate esters. A particularly suitable monomer is trimethylolpropane-trimethacrylate.

If, as described above, the polyfunctional reactive monomer is superimposed on the cross-linkable foam surface rather than incorporated into the cross-linkable foam composition, the polyfunctional reactive monomer will preferably be employed in an amount of from about 8 to about 100 parts per 100 parts of resin, and more preferably from about 10 to about 30 parts per 100 parts of resin.

If the cross-linkable foam composition contains a blowing agent, the blowing agent will preferably be employed in an amount within the range of from about 0.5 to about 10 parts per 100 parts of resin.

Any suitable blowing agent can be employed, a particularly suitable blowing agent is azodicarbonamide.

Optionally, the cross-linkable foam composition can also contain a platicizer for the resin, a heat and/or light stabilizer, a surfactant and the like.

In its preferred form, the cross-linkable foam composition will contain at least one plasticizer in a total amount up to about 100 parts, preferably about 40 to about 60 parts, per 100 parts of resin.

Any suitable plasticizer can be employed. A particularly suitable plasticizer is dioctyl phthalate.

In its preferred form, the cross-linkable foam composition will contain at least one heat and/or light stabilizer in a total amount up to about 5 parts, preferably about 1 to about 3 parts, per 100 parts of resin.

Any suitable heat and/or light stabilizer can be employed. Suitable stabilizers are organo-tin compounds, a particularly suitable organo-tin compound [dibutyltin bis(alkyl maleate)] is designated "Mark 275," commercially available from Argus Chemical Company.

In its preferred form, the cross-linkable foam composition will contain at least one surfactant in a total amount up to about 10 parts, preferably 1 to 8 parts, per 100 parts of resin. Any suitable surfactant can be employed. Particularly suitable for use are two resinous dimethyl silicates designated "Dow-Corning 1250 Silicone Surfactant," and "Dow-Corning 1252 Silicone Surfactant," both commercially available from Dow-Corning Corporation.

The activator composition of this invention may contain an initiator (or catalyst) in very small amounts or up to about 100 percent by weight of the composition. In its preferred form, the activator composition will contain from about 7 to about 20 percent by weight of the composition of the initiator when printed on the foam surface. However, when deposited on the surface by other means, the initiator (or catalyst) may be used in pure form. The initiators are well known in the art and are understood to include free radical generators and acid catalysts.

Any suitable initiator can be employed. Particularly suitable initiators include the organic peroxides, especially benzoyl peroxide, oxalic acid, methane sulfonic acid, and the like. The activator compositions will contain a carrier for the initiator in an amount within the range of from about 0 to about 99 percent by weight of the activator composition. In its preferred form the activator composition will contain from about 80 to about 93 percent by weight of the composition of the carrier when printed on the foam surface, as referred to above.

The carrier can be any suitable material which serves as a solvating material for the foam. Suitable carriers include methyl isobutylketone, cyclohexanone, and the like.

The activator composition can also be formed to include various well known dyes, pigments, and binders, such that the activator functions as an ink composition and serves to make a design on the foam on which it is deposited.

The deactivator composition will comprise an inhibitor in very small amounts or up to about 100 percent by weight of the composition. In its preferred form, the deactivator composition will contain from about 7 to about 20 percent by weight of the composition of inhibitor when printed on the foam surface. However, when deposited on the surface by other means, the inhibitor may be used in pure form.

Any suitable inhibitor can be employed. Particularly suitable inhibitors include hydroquinone, toluquinone, the monomethyl ether of hydroquinone, and the like. Additionally, as known in the art, oxygen and bases such as sodium hydroxide can be employed as inhibitors. The deactivator composition will contain a carrier for the inhibitor in an amount within the range of from about 0 to about 99 percent by weight of the deactivator composition. In its preferred form, the deactivator composition will contain from about 80 to about 93 percent by weight of the composition of the carrier when printed on the foam surface, as referred to above. Optionally, the deactivator composition can also be formulated to include various well known dyes, pigments and binders such that the deactivator composition also functions as an ink composition.

Furthermore, combinations of activators and deactivators may be used. A deactivator composition may be superimposed over at least a portion of the activator composition in order to counteract the effect of the activator composition, or the deactivator composition may be deposited on portions of the cross-linkable foam surface prior to the deposition of the activator composition in order to counteract the effect of the activator composition.

The wear layer which is applied over the foam surface or any portion thereof is a clear coat which serves to protect the underlying pattern. These clear coats are well known in the art and typically comprise poly (vinyl chloride) materials and/or urethane, and the final clear coat thickness may be in the range of about 1 to about 20 mils. The wear layer can be applied by conventional and well known methods either prior to cross-linking or after cross-linking has been completed, or both.

To prepare an embossed surface covering according to this invention, a cross-linkable foam as described above is applied at any desired thickness to any backing normally used in the industry using any conventional method of application, for example, a blade over roll applicator.

Next, the process takes one of several alternatives relating to whether the cross-linkable foam is produced mechanically or by incorporation of a blowing agent, and also depending upon the point at which the wear layer is applied.

In the first alternative, if the cross-linkable foam is produced mechanically, the cross-linkable foam-containing sheet is subjected to heat in a conventional manner at a temperature within the range of from 200° to 400° F. for a period of from about 15 seconds to about 20 minutes in order to form the foam-containing sheet. In a second alternative, if the cross-linkable foam is produced by the incorporation of a blowing agent, the cross-linkable foam-containing sheet is subjected to heat in a conventional manner at a temperature and for a period of time sufficient to decompose the blowing agent, thus forming a foam-containing sheet.

At this point, if the polyfunctional reactive monomer has not been incorporated into the cross-linkable foam composition or if a thermoplastic polyfunctional reactive resin is not employed, the polyfunctional reactive monomer is applied to the foam surface using any conventional method of application, for example, reverse roll coating, and allowed to migrate into the foam to produce a cross-linkable foam before proceeding.

If desired, in order to facilitate processing, the cross-linkable foam on the sheet can be reversibly compressed to a higher density as set forth in U.S. Pat. Nos. 4,198,448 and 4,258,085. The activator composition is then deposited on at least a portion of the surface of the cross-linkable foam using any conventional method of deposition, the amount deposited on the foam surface depending on the particular method of deposition. For example, if rotogravure printing is selected as a method of deposition, a very small amount of the composition will be deposited as compared to the situation where screen or block printing is used.

The only limitation regarding the method of deposition of the activator composition is that the method must suffice to deposit a sufficient amount of composition on the foam surface to initiate cross-linking in the portion of the foam affected by the deposition of activator composition. In one embodiment, either before or after depositing the activator composition, in employing the same methods described above, a deactivator composition may be deposited on a portion of the cross-linkable foam surface or, alternatively, superimposed over a portion of the activator composition. The deactivator composition serves to stop or alter the reaction between the activator composition and the polyfunctional reactive monomer. The amount of deactivator composition deposited must be sufficient to either significantly or completely counteract the effect of the activator composition.

The wear layer coat can be applied either after depositing the activator composition (or the deactivator composition) on the surface, or it can be applied after the cross-linking step is complete. It is well known in the art that oxygen can inhibit cross-linking if free radical initiators are employed and, in such cases, it is necessary to protect the cross-linkable foam from air during the cross-linking step. This can be achieved, for example, by using a closed-cell foam matrix, by conducting the cross-linking in an inert atmosphere, or by superimposing an oxygen barrier over the foam. When rollers or presses are used during the cross-linking step, the roller face or the platten face, respectively, may serve as the oxygen barrier. However, the most convenient way to exclude oxygen is by applying the wear layer prior to cross-linking, either to the areas which require protection or as a continuous film over the entire surface.

The resulting sheet, with or without wear layer, is subjected to heat in a conventional manner at a temperature within the range of from about 200° to about 500° F. in order to: (1) cause the cross-linkable foam, if reversibly compressed, to expand substantially to its original foam height, (2) cause the portions of the foam affected by the deposition of activator composition to cross-link, and (3) if the sheet has a wear layer, to fuse the foam and wear layer. Further, if the sheet has a wear layer attached, it may be uniformly compressed while hot to a desired embossing depth. Alternatively, it may be cooled and then partially reheated, or it may be only partially cooled prior to being uniformly compressed. These techniques may be used to control the embossing depth as is more fully discussed below.

During the compression step, pressure is applied uniformly to all portions of the surface by the non-patterned roll or press causing the noncross-linked regions to flow. Upon removal of the compressing force, the noncross-linked regions remain depressed whereas the cross-linked regions return essentially to their original height. As a result, the wear layer is affixed reltively uniformly to the contoured surface of the underlying foam. It must be noted, however, that the amount of pressure applied to the sheet should not exceed that which will compress the sheet to a density equal to its bulk density. If excess pressure is applied, the cross-linked regions might be irreversibly compressed, thereby diminishing the embossing effect.

If the sheet does not have a wear layer attached thereto, the sheet is cooled upon conclusion of the cross-linking step, the wear layer is applied by conventional means, and the sheet with wear layer attached is then reheated, either uniformly or differentially, to 200° to about 500° F. and uniformly compressed.

The above processes have the advantage of overcoming several defects encountered with conventional print-on embossing techniques. As previously mentioned, the flow which is encountered with print-on embossing is accomplished by gravity. Therefore, a higher temperature must be achieved in order to obtain this flow. If the activator deposited on the foam surface has inadequately migrated into the foam matrix, nonuniform cross-linking can occur in areas where complete cross-linking should have occurred. Alternatively, if activator/deactivator deposited on the foam surface has inadequately migrated into the foam matrix, non-uniform cross-linking can similarly occur. In either event, when these areas are heated to achieve flow, both nonuniformly cross-linked and uncross-linked regions can show sag, and the ability to accurately control the gauge of the product is lost.

With the present invention this problem is much diminished. Although nonuniform migration of the activator may still occur, a lower temperature may be used to achieve the flow of the noncross-linked regions. This result is obtained because the noncross-linked resin is compelled to flow by the uniformly applied pressure; thus, the higher temperature needed to obtain gravity flow is not required although its use is not precluded.

Furthermore, the use of temperature and pressure may also be used selectively to control the depth of embossing. For example, if only the upper regions of the sheet are heated and the lower regions are kept at a lower temperature, when pressure is applied to the differentially or non-uniformly heated structure, only the upper regions of the structure will flow and the embossing will be relatively shallow. Conversely, if the sheet is heated throughout, the entire mass of noncross-linked resin can be compelled to flow and deep embossing will be obtained. Of course, it will be recognized that because the embossing is a function of both temperature and pressure, variable results may be obtained depending on the extent of heating, and on the temperatures and pressures that are employed.

The aforementioned processes result in surface coverings which have superior structural strength and improved definition of patterns lying beneath the wear layer. In addition, the problems associated with matching the melting characteristics of the wear layer and the underlying foam have been obviated.

Having described the ingredients and the methods of invention, reference is now made to the following examples which are provided by way of illustration and not to limit the practices of the present invention.

EXAMPLES

Preparation of Foam Sample

A combination of about 100 parts of a thermoplastic resin blend comprising about 80 parts of poly(vinyl chloride) resin homopolymer and about 20 parts of poly(vinyl chloride) resin copolymer, about 50 parts per 100 parts of the resin blend of a plasticizer (dioctyl phthalate), about 20 parts per 100 parts of the resin blend of a polyfunctional reactive monomer (trimethylolpropane-trimethacrylate), about 2 parts per 100 parts of the resin blend of an organotin stabilizer ("Mark 275"), and about 4 parts per 100 parts of the resin blend of a silicone surfactant ("Dow-Corning 1252 Silicone Surfactant") is placed in an Oakes Foamer and mechanically foamed. The recoverd cross-linkable foam is recovered and applied to a gelled plastisol-coated release paper using a blade over roll applicator.

The resulting cross-linkable foam-containing sheet is heated for about 10 minutes at a temperature of about 270° F. to gel the foam which, upon testing, has a foam density of about 24 pounds per cubic foot and a thickness of about 0.06".

An activator/ink composition is prepared by placing about 10% by weight of an initiator (benzoyl peroxide), about 63% by weight of a carrier (methyl isobutyl ketone), about 6% by weight of a pigment and about 21% by weight of a binder in a mixing vessel at room temperature and stirring to obtain uniformity. The contents of the vessel are recovered and the resulting composition is selectively rotogravure printed on portions of the foam surface of the above sheet. Printed foam sheet as described above is used in the following examples.

EXAMPLE 1

The printed foam sheet is coated with about 4 mils of poly (vinyl chloride) plastisol wear layer which serves as an oxygen barrier. The coated material is heated at 380° F. for about 2 minutes to cross-link the foam component and to fuse the foam and the plastisol; however, the brief heating does not induce melt flow. After cooling the coated sheet to room temperature, about 6 mils of a 45%-solids curable urethane coating is applied. This sheet is heated in an oven at 425° F. to dry and cure the urethane layer and to induce foam melt-down in noncross-linked regions. When dried and cured, the urethane layer is mildly cross-linked and is not thermoplastic; i.e., it has high melt viscosity. This process is complete after two minutes; however, severe shriveling and discoloration of the urethane layer, as well as localized bridging of the urethane over the melted foam regions, is observed.

EXAMPLE 2

A sheet similar to that described in Example 1 is prepared by placing a layer of urethane on a polypropylene release paper and curing the urethane at 275° F. for seven minutes. This process produces approximately a 4-mil precured dry layer. The precured urethane layer is subsequently laminated to a plastisol-coated cross-linked composite such as described in Example 1 using a flatbed press. The top platten of the press is at 280° F. whereas the bottom platten is cold. After exerting contact pressure for approximately eight seconds, the pressure is released. The release paper is removed after cooling the laminated material to room temperature. The laminated, unembossed composite is then placed in an oven at 425° F. for two minutes thereby producing a product which also demonstrates bridging of the urethane layer in the melted foam regions.

EXAMPLE 3

A printed foam sheet as described above is coated with about 8 mils of a poly (vinyl chloride) plastisol of high melt viscosity having the following formulation:

| Formulation | Parts by Weight |
| --- | --- |
| Dispersion Grade PVC Homopolymer | 75 |
| Blending Grade PVC Homopolymer | 25 |
| Primary Plasticizer | 24.8 |
| Secondary Plasticizer | 17.5 |
| Epoxy Stabilizer | 3.0 |

The composite sheet, with widely diverse melt characteristics between the respective layers, is subsequently heated at 425° F. for two minutes. After cooling, the resultant product has melt embossing in the noncross-linked foam regions with the plastisol wear layer demonstrating bridging in the melted regions. These three examples illustrate the problems which may be encountered if the composite material is not processed according to the present invention.

EXAMPLE 4

This example will illustrate the advantages of practicing the present invention. The printed foam sheet as set forth above is coated with a 4-mil poly (vinyl chloride) plastisol layer as set forth in Example 1. The composite material is heated at 380° F. for two minutes to cross-link the foam and to fuse the foam and plastisol layers, but not long enough to induce melt flow. A 4-mil precured urethane layer is prepared on release paper and laminated to the foam composite as set forth in Example 2. After cooling to room temperature, the release paper is removed from the composite.

The laminated composite is placed in a flatbed press with the top platten at 290° F. and the bottom platten cold. The press is closed to minimum contact for about 1.5 minutes to transfer heat into the film and foam layers. Subsequently, the press is closed to uniformly compress the composite to about 50% of its thickness and then immediately opened. The resulting sheet has excellent embossed definition with the high-melt-viscosity urethane layer conforming to the melt embossed foam regions. Analysis indicates that the pressure and temperature conditions used above resulted in flow in the noncross-linked foam regions. Discoloration of the sample is significantly reduced when compared to the gravity flow melt embossed sample of Example 1.

EXAMPLE 5

The process as set forth in Example 4 is employed except that uniform pressure is applied to the laminated composite by using a continuous smooth-roll pressure process comprising the steps of preheating the composite to 290° F. and contacting it with a hot upper roll maintained at 290° F. A product similar to that of Example 4 is obtained.

Our invention is not restricted solely to the descriptions and illustrations provided above, but encompasses all modifications envisaged by the following claims.

We claim:

1. A process for forming embossed surface coverings from a cross-linkable foam on a backing, said process comprising the steps of:
   forming said foam on said backing,
   selectively depositing a cross-linking initiator on the foam surface,
   applying a first wear layer coating over at least a portion of said foam surface,
   heating the coated foam to fuse the foam and wear layer and effect cross-linking of the initiator-coated regions to form regions of cross-linked composite material,
   adjusting the temperature of the cross-linked composite material at least to a temperature at which the noncross-linked foam will flow under pressure,
   applying sufficient uniform pressure to said cross-linked composite material to compress it to a desired embossing depth, said pressure being not greater than that pressure which will compress said material to a density equal to the bulk density of the noncross-linked foam, and
   removing the compressing force,
   whereby noncross-linked regions are embossed whereas cross-linked regions substantially return to their original height.

2. The invention according to claim 1 hereof wherein said first wear layer and said noncross-linked foam have substantially the same melt flow characteristics.

3. The invention according to claim 1 hereof wherein said first wear layer and said noncross-linked foam have substantially different melt flow characteristics.

4. The invention according to claims 2 or 3 hereof wherein said first wear layer comprises a poly (vinyl chloride) material.

5. The invention according to claim 3 wherein said first wear layer comprises a urethane.

6. The invention according to claims 2 or 3 hereof wherein a second wear layer coating is applied after cross-linking the composite material.

7. The invention according to claim 6 hereof wherein said first wear layer comprises a poly (vinyl chloride) material and said second wear layer comprises a urethane.

8. The invention according to claim 6 hereof wherein said first and second wear layers comprise poly (vinyl chloride) material.

9. The invention according to claims 2 or 3 hereof wherein the temperature of said cross-linked composite material during compression is substantially uniform throughout.

10. The invention according to claims 2 or 3 hereof wherein a differential temperature is used during the compression of said cross-linked composite material.

11. The invention according to claim 9 hereof wherein said temperature has a maximum value which is less than the gravity flow temperature of said noncross-linked foam.

12. The invention according to claim 10 hereof wherein the highest value of said differential temperature is less than the gravity flow temperature of said noncross-linked foam.

13. A process for forming embossed surface coverings from a cross-linkable foam on a backing, said process comprising the steps of:
   forming said foam on said backing,
   selectively depositing a cross-linking initiator on the foam surface,
   heating the foam to effect cross-linking of the initiator-coated regions to form regions of cross-linked composite material,
   applying a wear layer coating to the partially cross-linked sheet,
   adjusting the temperature of the cross-linked composite material at least to a temperature at which the noncross-linked foam will flow under pressure,
   applying sufficient uniform pressure to said cross-linked composite material to compress it to a desired embossing depth, said pressure being not greater than the pressure which will compress said material to a density equal to the bulk density of the noncross-linked foam, and
   removing the compressing force,
   whereby noncross-linked regions are embossed whereas cross-linked regions substantially return to their original height.

14. The invention according to claim 13 hereof wherein said wear layer and said noncross-linked foam have substantially the same melt flow characteristics.

15. The invention according to claim 13 hereof wherein said wear layer and said noncross-linked foam have substantially different melt flow characteristics.

16. The invention according to claims 14 or 15 hereof wherein said wear layer comprises a poly (vinyl chloride) material.

17. The invention according to claim 15 wherein said wear layer comprises a urethane.

18. The invention according to claims 14 or 15 hereof wherein the temperature of said cross-linked composite material during compression is substantially uniform throughout.

19. The invention according to claims 14 or 15 hereof wherein a differential temperature is used during the compression of said cross-linked composite material.

20. The invention according to claim 18 hereof wherein said temperature has a maximum value which is less than the gravity flow temperature of said noncross-linked foam.

21. The invention according to claim 19 hereof wherein the highest value of said differential temperature is less than the gravity flow temperature of said noncross-linked foam.

22. The invention according to claims 1 or 13 wherein a deactivator composition is superimposed over at least a portion of the activator composition-coated regions of said foam.

23. The invention according to claims 1 or 13 wherein a deactivator composition is deposited on at least a portion of said foam surface prior to the deposition of said activator composition.

* * * * *